(12) United States Patent
Dooley

(10) Patent No.: US 9,194,385 B1
(45) Date of Patent: Nov. 24, 2015

(54) COMBINATION AIR PUMP, FLASHLIGHT AND TOOLKIT

(76) Inventor: Leonard L. Dooley, Playa del Rey, CA (US)

( * ) Notice: Subject to any disclaimer, the term of this patent is extended or adjusted under 35 U.S.C. 154(b) by 730 days.

(21) Appl. No.: 13/596,002

(22) Filed: Aug. 27, 2012

(51) Int. Cl.
*F04B 33/00* (2006.01)
*F04B 39/14* (2006.01)
*B60C 25/02* (2006.01)

(52) U.S. Cl.
CPC ............. *F04B 33/005* (2013.01); *B60C 25/02* (2013.01); *F04B 39/14* (2013.01); *Y10T 137/3584* (2015.04)

(58) Field of Classification Search
CPC ...... B60C 23/10; B60C 23/105; B60C 25/02; B60C 25/16; F04B 33/005; F04B 39/12; F04B 39/14; Y10T 137/3584; A45B 3/04
USPC .................................... 92/58.1; 417/313, 572
See application file for complete search history.

(56) References Cited

U.S. PATENT DOCUMENTS

| | | | | |
|---|---|---|---|---|
| 3,907,461 A | * | 9/1975 | Bouder | 417/63 |
| 3,926,205 A | * | 12/1975 | Gourlet | 137/223 |
| 4,477,936 A | * | 10/1984 | Weston | 7/139 |
| 5,715,554 A | * | 2/1998 | Downs et al. | 7/138 |
| 5,898,965 A | * | 5/1999 | Chuang | 7/170 |
| 6,044,508 A | * | 4/2000 | Chuang | 7/138 |
| 2005/0225970 A1 | * | 10/2005 | Molthop et al. | 362/202 |
| 2006/0198154 A1 | * | 9/2006 | Naylor | 362/473 |
| 2010/0328924 A1 | * | 12/2010 | Nissen | 362/84 |

* cited by examiner

*Primary Examiner* — Devon Kramer
*Assistant Examiner* — Joseph Herrmann
(74) *Attorney, Agent, or Firm* — QuickPatents; Kevin Prince

(57) ABSTRACT

A toolkit includes a hollow handle adapted to be fixed with an air pump body that includes a stem clamp actuator with a lever receptacle, and a pump actuator piston terminating in a pump cap. The pump body includes an air output port fixable with an air input port of a vehicle wheel. The pump body expels air upon manual reciprocal pumping of the pump actuator piston with the pump cap. An end cap fixes with the hollow handle and terminates in an LED lamp. The pump lever and a tire lever both include a plurality of additional tool sections, such as a universal ¼" hexagonal shank aperture, wrench, a spoke wrench, a tire axle bolt wrench, a screwdriver, a bottle opener, additional wrench sizes, and the like. Both the pump lever and the tire lever may be used to aid in changing a flat tire, for example.

6 Claims, 3 Drawing Sheets

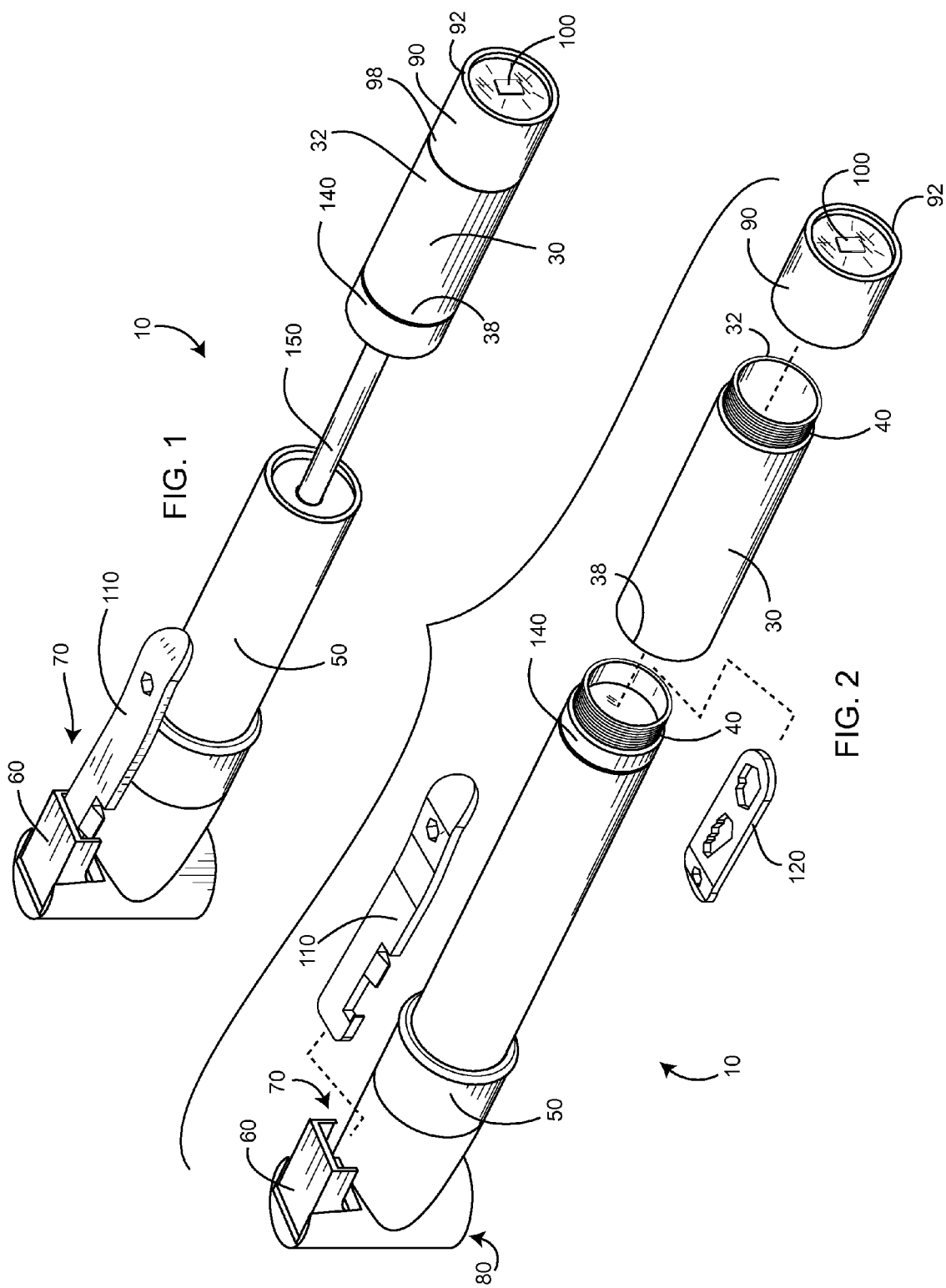

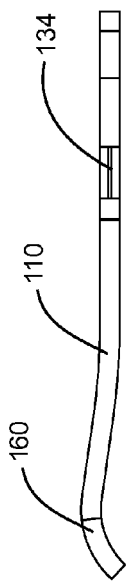
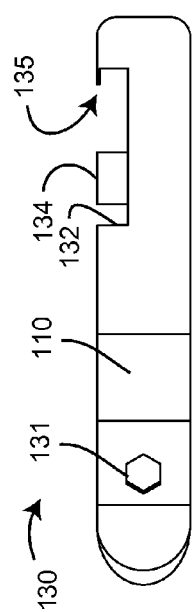
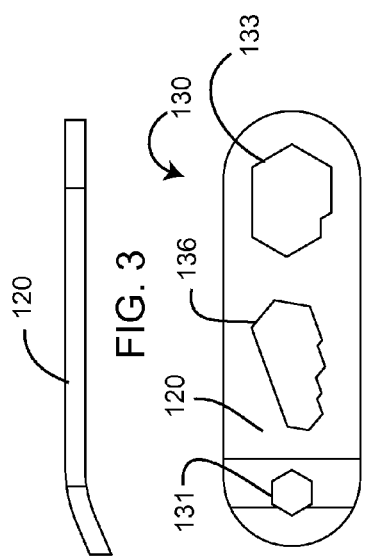
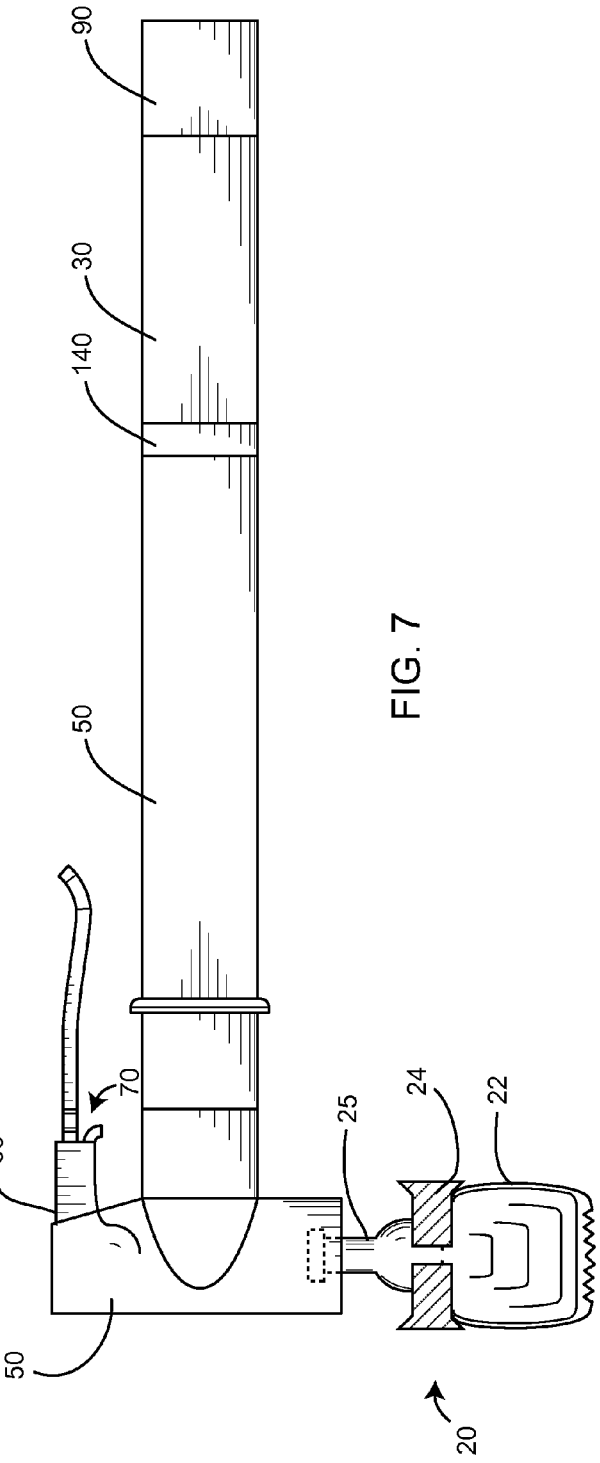

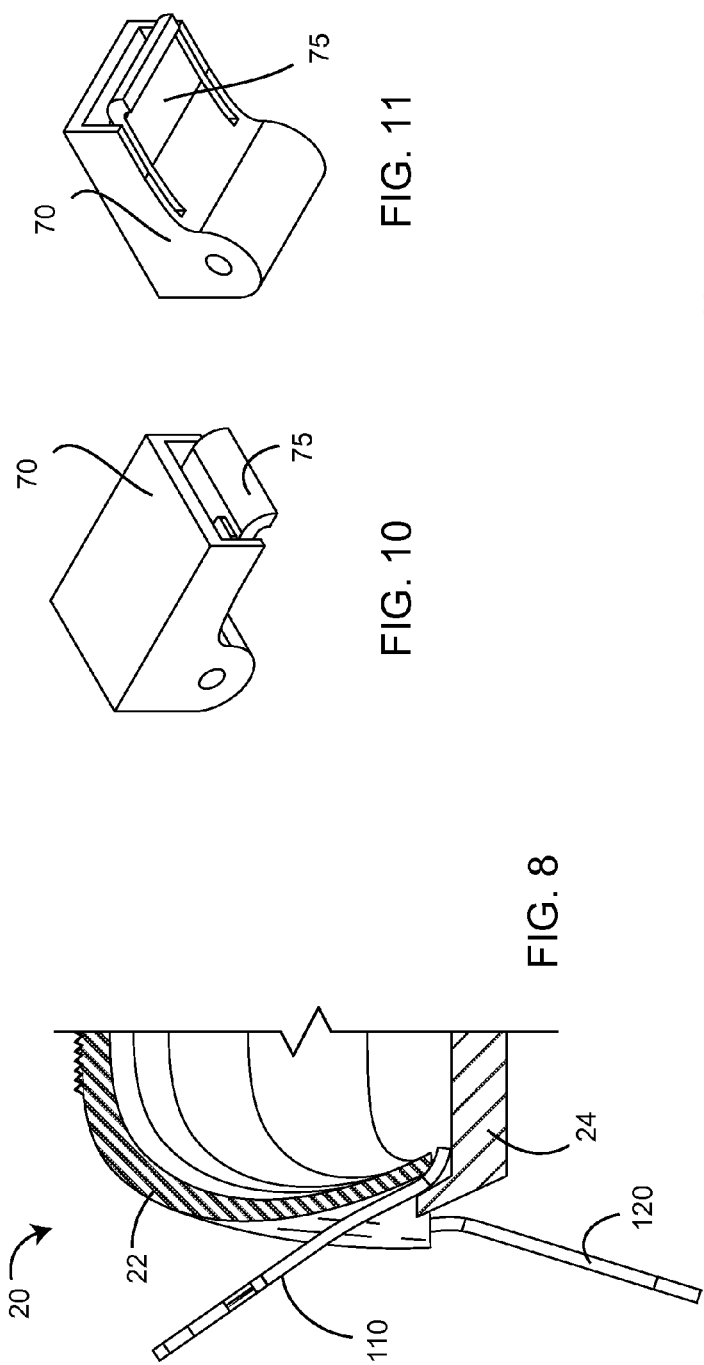

COMBINATION AIR PUMP, FLASHLIGHT AND TOOLKIT

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

This invention relates to toolkits, and more particularly to a compact toolkit for bicyclists and the like.

DISCUSSION OF RELATED ART

Bicyclists often carry a variety of tools and accessories to aid in the event of a breakdown, such as a flat tire. Such tools may be a pair of tire removal levers to aid in the removal of a tire from a bicycle wheel, wrenches for tightening spokes or wheel nuts, screwdrivers, flat tire repair kits, air pumps, matches, flashlights, and the like. Heretofore such items have had to be placed in a backpack or other carrying container, which resulted in a bulky, difficult to manage set of tools.

Bicycle air pumps are well known in the market and often include a convenient clip for attaching the pump, in a compact configuration, to the frame of the bicycle conveniently out of the way during riding of the bicycle. However, such compact air pumps of the prior art only provide for the function of an air pump, requiring the cyclist to still carry a backpack or other container full of other desired tools.

Therefore, there is a need for a compact device that includes not only a bicycle wheel inflation air pump, but also a flashlight and the tools most commonly needed by a cyclist. Such a needed invention would be compact, easy to store on a frame of a bicycle or the like, and would be easy to use. Additional items desired by the cyclist could be easily stored in such a needed invention. The present invention accomplishes these objectives.

SUMMARY OF THE INVENTION

The present device is a toolkit for a bicycle or other vehicle having one or more wheels that each have an air input port, also called a tire stem. Herein the vehicle is referred to as a bicycle, but the toolkit is not limited to use with just bicycles and, in fact, could be useful even without a vehicle, such as with other pneumatic products requiring compressed air or tools as may be the case during hiking, camping, sporting events, boating, or the like. A substantially hollow handle has a forward end and a rear end, each being open and terminating in a screw thread.

An air pump body includes a stem clamp actuator that has a lever receptacle, and a pump actuator piston terminating in a pump cap adapted fixing with the forward end of the hollow handle. The air pump body further includes an air output port adapted for fixing with an air input port or valve stem of any of the wheels, and positively capturing the stem when the stem clamp actuator is actuated with the lever receptacle. The air pump body expels air from the output port upon manual reciprocal pumping of the pump actuator piston with the pump cap. The air pump body includes an air pump mechanism that includes a one-way air valve or the like for pumping air in one direction. An end cap is adapted for fixing with the rear end of the hollow handle. The end cap terminates in a battery-operated lamp, such as an LED lamp. The battery may be rechargeable.

A pump lever is adapted for selective engagement with the lever receptacle of the air pump body and to provide greater leverage for actuating the stem clamp to clamp the air outlet port to the valve stem. The pump lever and a tire lever both include a plurality of additional tool sections, such as a universal ¼" hexagonal shank to accept Allen bits, screwdriver bits, socket bits and the like, a tire air valve wrench, a spoke wrench, a tire axle bolt wrench, a regular screwdriver, a bottle opener, additional wrench sizes, or the like. Both the pump lever and the tire lever are preferably made from a strong cast or stamped metal material, such as titanium or other strong metal, and may include a curved end that may be used to aid separation of a rubber tire portion of each wheel from a rim portion of the wheel, such as while changing a flat tire, for example.

The hollow handle is adapted for containing the tire lever, and other items as may be desired by a user of the toolkit. For example, other helpful items for bicycles that may be stored within the hollow handle are additional tools, Allen bits, a bicycle tire repair kit, matches, and the like.

The present invention is a compact device that includes not only a bicycle wheel inflation air pump, but also a flashlight and the tools most commonly needed by a cyclist. The present device is compact, easy to store on a frame of a bicycle, and is easy to use. Additional items desired by the cyclist can be easily stored in the present invention. Other features and advantages of the present invention will become apparent from the following more detailed description, taken in conjunction with the accompanying drawings, which illustrate, by way of example, the principles of the invention.

DESCRIPTION OF THE DRAWINGS

FIG. 1 is a perspective view of one embodiment of the invention, illustrated with an air pump actuator piston in an extended position;

FIG. 2 is an exploded perspective view of FIG. 1, but with the pump actuator piston in a retracted position;

FIG. 3 is a side elevational view of a tire lever of the invention;

FIG. 4 is a top plan view of FIG. 3;

FIG. 5 is a side elevational view of a pump lever of the invention;

FIG. 6 is a top plan view of FIG. 5;

FIG. 7 is a side elevational view of the embodiment of FIG. 2, illustrating a pump body of the invention in-use on a bicycle tire;

FIG. 8 is a cross-sectional view of the tire lever and pump lever being used to dislodge a rubber tire portion of the bicycle wheel away from a rim portion thereof;

FIG. 9 is a bottom plan view of the embodiment of FIG. 2;

FIG. 10 is a top perspective view of a lever receptacle of the invention, and

FIG. 11 is a bottom perspective view of the lever receptacle.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. The terms air input port, valve, valve stem, and stem are all used interchangeably to refer to a tire valve stem of a pneumatically inflated wheel.

FIGS. 1-2 show a toolkit 10 for a bicycle or other vehicle (not shown) having one or more wheels 20 (FIGS. 7-8) that each include an air input port 25 (FIG. 7). Herein the vehicle is referred to as a bicycle, but the toolkit is not limited to use with just bicycles and, in fact, could be useful even without a vehicle, such as while hiking or camping, at sporting events, boating, or the like.

A substantially hollow, preferably metallic handle 30 has a forward end 38 and a rear end 32, each being open and terminating in a screw thread 40. It is understood that use of the term "screw thread" may include either male or female screw threads 40 that are mutually cooperative, although the invention is not limited to screw threads 40 and could include instead other types of mechanical fasteners (not shown).

An air pump body 50 includes a stem clamp actuator 60 that has a lever receptacle 70 and a pump actuator piston 150 (FIG. 1) terminating in a pump cap 140 adapted for fixing with the forward end 38 of the hollow handle 30 at screw threads 40 (FIG. 2). The air pump body 50 further includes an air output port 80 adapted for fixing with the air input port 25 of any of the wheels 20 (FIG. 7). The air pump body 50 expels air from the output port 80 upon manual reciprocal pumping of the pump actuator piston 150 with the pump cap 140. The air pump body 50 includes an air pump mechanism (not shown) that includes a one-way air valve, as is known in the art.

An end cap 90 with the screw threads 40 at a forward end 98 thereof is adapted for fixing with the rear end 32 of the hollow handle 30. The end cap 90 has a rear end 92 terminating in a battery-operated lamp 100, such as an LED lamp. The battery (not shown) may be rechargeable. A battery and switch (not shown) may be included as is known in the art. Preferably the lamp 100 includes at least a steady-on mode, a flashing distress signal mode, and an off mode.

A pump lever 110 is adapted for selective engagement with the lever receptacle 70 of the air pump body 50. The pump lever 110 includes a plurality of additional tool sections 130, such as a universal ¼" hexagonal shank aperture 131 for accepting Allen bits, screwdriver bits, socket bits (not shown) and the like, a spoke wrench 132, a tire axle bolt wrench 133, a regular screwdriver 134, a bottle opener 135, additional wrench sizes 136, and the like. The air outlet port 80 captures the air input port stem 25 of the at least one wheel 20 when the stem clamp 60 is actuated by the lever receptacle 70, the pump lever 110 inserted into the lever receptacle 70 to provide increased leverage for the manual clamping of the air outlet port 80 onto the stem 25 of the at least one wheel 20.

In one embodiment the lever receptacle 70 includes a manually-actuable resilient snap 75 (FIGS. 10 and 11) for positive engagement with a pump lever 110. As such, the pump lever 110 may be manually inserted and locked into the lever receptacle 70 or, by actuating the snap 75, removed from the lever receptacle 70.

A tire lever 120 is further included and has a second plurality of the additional tool sections 130, such as a universal ¼" hexagonal shank aperture 131 to accept Allen bits, screwdriver bits, socket bits (not shown), a spoke wrench 132, a tire axle bolt wrench 133, a regular screwdriver 134, a bottle opener 135, additional wrench sizes 136, and the like.

Both the pump lever 110 and the tire lever 120 are preferably made from a strong cast or stamped metal material, such as titanium or other strong metal, and may include a curved end 160 (FIG. 5) that may be used to aid separation of a rubber tire portion 22 of each wheel 20 from a rim portion 24 of the wheel 20 (FIG. 8), such as while changing a flat tire, for example.

The hollow handle 30 is adapted for containing the tire lever 120 and other items as may be desired by a user of the toolkit 10. For example, other helpful items for bicycles that may be stored within the hollow handle 30 are additional tools, a bicycle tire repair kit, matches and the like (all not shown). The hollow handle 30 is preferably made from an aluminum tube or the like.

Each screw thread 40 is either male or female based on its intended use as necessary. The female screw threads 40 may include an O-ring (not shown) for forming a water-tight seal.

While a particular form of the invention has been illustrated and described, it will be apparent that various modifications can be made without departing from the spirit and scope of the invention. For example, while the hollow handle 30 and pump cap 140 are shown as cylindrical, they could be formed with square cross sections and the threads 40 could be replaced with snap-together male and female mechanical fasteners, or the like (not shown). Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A toolkit for a vehicle having at least one wheel with an air input port, comprising:
   a substantially hollow handle having forward and rear ends, each end open and terminating in a screw thread;
   an air pump with an air pump body including a stem clamp actuator having a lever receptacle and a pump actuator piston terminating in a pump cap adapted for fastening to the forward end of the substantially hollow handle, the air pump body including an air output port adapted for fixing with the air input port of the at least one wheel, the air pump expelling air from the air output port upon manual reciprocal pumping of the pump actuator piston with the pump cap;
   an end cap with cooperative screw threads at a forward end adapted for fastening to the rear end of the substantially hollow handle, the end cap having a rear end terminating in a battery-operated lamp;
   a pump lever adapted for selective engagement with the lever receptacle, the pump lever including a plurality of additional tool sections; and
   a tire lever including a second plurality of additional tool sections;
   whereby the pump lever and the tire lever are configured to separate a rubber tire portion of each wheel from a rim portion of each wheel and the tire lever is contained within the substantially hollow handle when the toolkit is not in use.

2. The toolkit of claim 1 wherein the lamp includes an LED lamp.

3. The toolkit of claim 1 wherein the plurality of additional tool sections of the pump lever are taken from the group consisting of: a universal quarter inch hexagonal shank aperture, a spoke wrench, a tire axle bolt wrench, a screwdriver, a bottle opener, and a plurality of other wrench sizes.

4. The toolkit of claim 1 wherein the plurality of additional tool sections of the tire lever are taken from the group consisting of: a universal quarter inch hexagonal shank aperture, a spoke wrench, a tire axle bolt wrench, a screwdriver, a bottle opener, and a plurality of other wrench sizes.

5. The toolkit of claim 1 wherein the lamp includes at least a steady-on mode, a flashing mode, and an off mode.

6. The toolkit of claim 1 wherein the lever receptacle includes a manually-actuable resilient snap for positive engagement with the pump lever, whereby the pump lever can be manually inserted and locked into the lever receptacle or, by actuating the snap, the pump lever can be removed from the lever receptacle.

* * * * *